United States Patent
Rappel et al.

(10) Patent No.: US 7,817,380 B2
(45) Date of Patent: Oct. 19, 2010

(54) RAMP ARRANGEMENT FOR A DISK DRIVE AND METHOD

(76) Inventors: Brian L. Rappel, 1043 Kiowa Rd., Lyons, CO (US) 80540; Chad A. Bogacz, 13900 Lake Song La., B3, Broomfield, CO (US) 80020; David D. Brause, 1373 Clemson Dr., Longmont, CO (US) 80503

( * ) Notice: Subject to any disclaimer, the term of this patent is extended or adjusted under 35 U.S.C. 154(b) by 0 days.

(21) Appl. No.: 12/507,297

(22) Filed: Jul. 22, 2009

(65) Prior Publication Data
US 2009/0279210 A1 Nov. 12, 2009

Related U.S. Application Data

(63) Continuation of application No. 11/385,955, filed on Mar. 20, 2006, now Pat. No. 7,593,192.

(51) Int. Cl.
*G11B 5/54* (2006.01)
(52) U.S. Cl. .................................................... 360/255
(58) Field of Classification Search ............ 360/254.7, 360/254.8, 254.9, 255
See application file for complete search history.

(56) References Cited

U.S. PATENT DOCUMENTS

| | | | | |
|---|---|---|---|---|
| 4,933,785 A | * | 6/1990 | Morehouse et al. | 360/78.04 |
| 2005/0280945 A1 | * | 12/2005 | Duvall et al. | 360/254.7 |
| 2008/0094757 A1 | * | 4/2008 | Duvall et al. | 360/254.7 |

* cited by examiner

*Primary Examiner*—David D Davis
(74) *Attorney, Agent, or Firm*—Workman Nydegger

(57) ABSTRACT

A digital storage apparatus includes a housing defining a housing interior and defining a ramp support surface. A disk is supported for rotation in the housing. A head gimbal assembly is supported for use in pivotally accessing the disk in performing one or more data accesses and for moving to an unloaded position from an access position. A ramp arrangement receives the head gimbal assembly in the unloaded position. The ramp arrangement includes at least three feet for sliding engagement with the ramp support surface for use in at least partially establishing an operational position of the ramp arrangement. In one aspect, the housing defines a first surface and a second surface, which are in a transverse relationship with respect to one another. The ramp arrangement engages the first surface and the second surface for establishing an operational position of the ramp arrangement in the housing interior.

20 Claims, 4 Drawing Sheets

RAMP ARRANGEMENT FOR A DISK DRIVE AND METHOD

CROSS-REFERENCE TO RELATED APPLICATIONS

The present application is a continuation of U.S. patent application Ser. No. 11/385,955, now U.S. Pat. No. 7,593,192, filed Mar. 20, 2006 and entitled RAMP ARRANGEMENT FOR A DISK DRIVE AND METHOD, which is hereby incorporated by reference.

BACKGROUND

The present invention is directed generally to the field of disk drives and, more particularly, to a ramp arrangement for use as part of a disk drive and method.

Hard disk drives are a well-known form of digital storage arrangement using at least one disk that is supported for rotation. An actuator arrangement generally provides for pivotal movement of one or more transducers for use in performing data accesses using the rotating disk. Hard disk drives are susceptible to operational problems when the head or heads contact the disk, for example, as a result of reception of a mechanical shock. In the absence of rotation of the media, head to disk contact is sometimes catastrophic, since the slider which supports the heads can become stuck to the disk; relative movement can thereafter tear the head(s) from the actuator arm.

In view of the foregoing, the prior art contains a number of approaches for moving the heads to an unloaded position, out of contact with a data surface of the disk, for example, when the disk is rotating slower than normal, not rotating or no data accesses are anticipated. One arrangement for parking the head arrangement is described in U.S. Pat. No. 4,933,785 issued to Morehouse et al (hereinafter Morehouse). The latter describes a ramp configuration wherein the head arrangement is unloaded as a lift tab rides against a ramp and is, thereafter, seated in some sort of detent that is formed in the ramp. This form of hard disk drive can be generally referred to as a load/unload drive. While the Morehouse ramp was generally effective for its intended purposes, more recent developments have necessitated improvements. In particular, there remains a need for a ramp arrangement which is appropriate for use in smaller form factor drives.

The foregoing examples of the related art and limitations related therewith are intended to be illustrative and not exclusive. Other limitations of the related art will become apparent to those of skill in the art upon a reading of the specification and a study of the drawings.

BRIEF SUMMARY OF THE INVENTION

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements. These and other objects and features of the present invention will become more fully apparent from the following description and appended claims, or may be learned by the practice of the invention as set forth hereinafter.

In one aspect of the disclosure, a digital data storage apparatus includes a housing defining a housing interior and defining a ramp support surface. At least one disk is supported for rotation within the housing interior. A head gimbal assembly is supported within the housing interior for use in pivotally accessing the disk in performing one or more data accesses and for pivotally moving to an unloaded position from an access position. A ramp arrangement is configured for receiving the head gimbal assembly in the unloaded position. The ramp arrangement includes at least three feet for sliding engagement with the ramp support surface for use in at least partially establishing an operational position of the ramp arrangement in the housing.

In another aspect of the disclosure, a digital data storage apparatus includes a housing defining a housing interior and including a first surface and a second surface, both of which first and second surfaces are at least generally planar and in a transverse relationship with respect to one another. A disk is supported for rotation within the housing interior. A head gimbal assembly is supported within the housing interior for use in pivotally accessing the disk in performing one or more data accesses and for pivotally moving to an unloaded position from an access position. A ramp arrangement is configured for receiving the head gimbal assembly in the unloaded position. The ramp arrangement is configured for engaging the first surface and the second surface at least in part for establishing an operational position of the ramp arrangement in the housing interior.

In still another aspect of the disclosure, an apparatus is described for use in a hard disk drive. The hard disk drive includes a housing defining a housing interior, a disk supported for rotation within the housing interior and a head gimbal assembly supported within the housing interior for use in pivotally accessing the disk in performing one or more data accesses and for pivotally moving to an unloaded position from an access position. The apparatus includes a ramp arrangement that is configured for receiving the head gimbal assembly in the unloaded position. The ramp arrangement further includes at least three feet for sliding engagement with a ramp support surface, defined by the housing, for use in at least partially establishing an operational position of the ramp arrangement in said housing for supporting the head gimbal assembly in said unloaded position.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be illustrative rather than limiting.

DETAILED DESCRIPTION OF THE PREFERRED EMBODIMENTS

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiment shown, but is to be accorded the widest scope consistent with the principles and features described herein including modifications and equivalents, as defined within the scope of the appended claims. It is noted that the drawings are not to scale and are diagrammatic in nature in a way that is thought to best illustrate features of interest. Descriptive terminology such as, for example, upper/lower, right/left, front/rear and the like has been adopted for purposes of enhancing the reader's understanding, with respect to the various views provided in the figures, and is in no way intended as being limiting.

Figure 1:
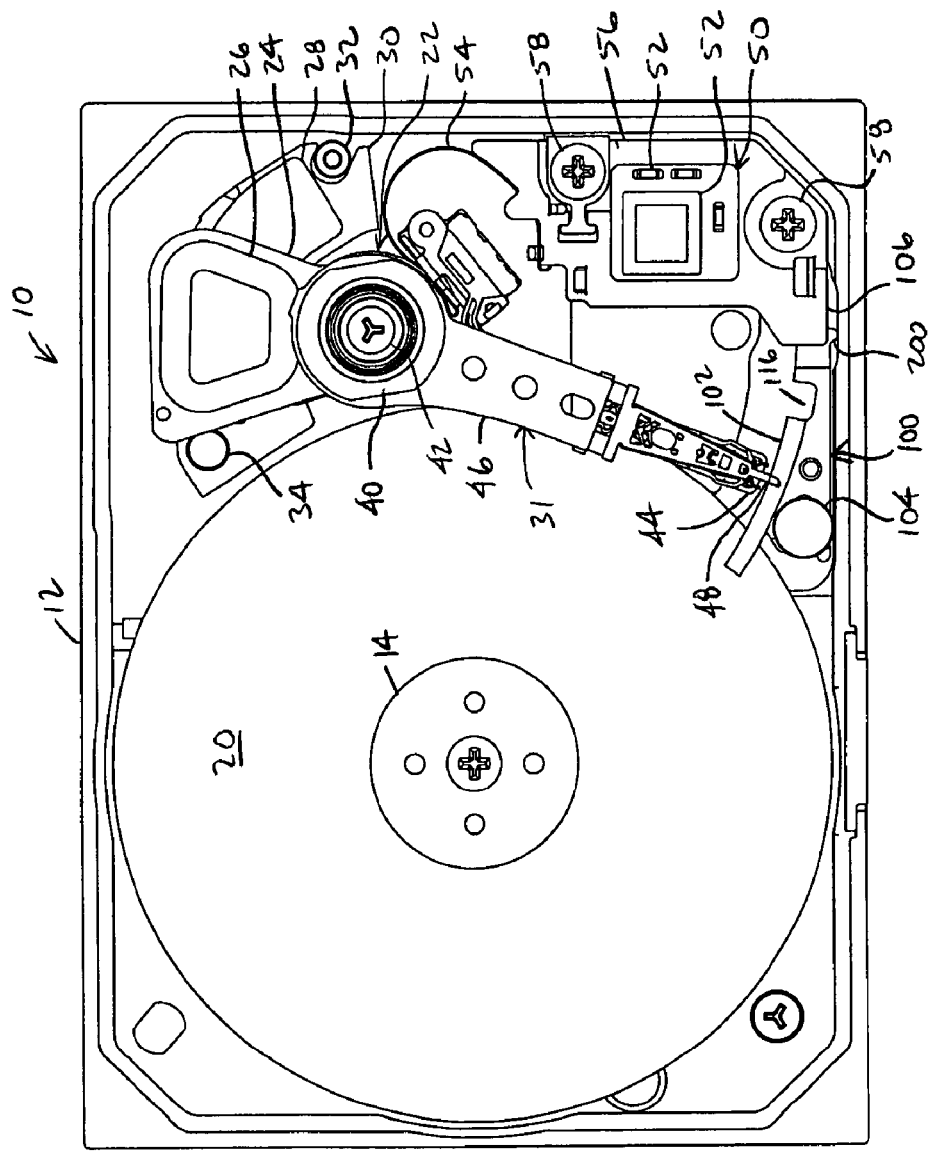
FIG. 1 is a diagrammatic, enlarged plan view of a hard disk drive that is produced in accordance with the present disclosure, having its cover removed for illustrative purposes.

Turning now to the figures, wherein like components are designated by like reference numbers whenever practical, attention is immediately directed to FIG. 1 which diagrammatically illustrates a hard disk drive, produced in accordance with the present disclosure, and generally indicated by the reference number 10. While drive 10 is a miniaturized hard disk drive produced by Cornice, Inc., of Longmont, Colo., and the teachings herein are considered to be highly advantageous with respect to accomplishing miniaturization of hard disk drive 10, it is to be appreciated that the concepts that have been brought to light herein are readily applicable with respect to any form factor hard disk drive.

Still referring to FIG. 1, drive 10 has been illustrated with its cover removed in order to show the various components which make up the drive. Drive 10 includes a base 12, supporting a spindle motor 14 for use in rotating a disk 20. It should be appreciated that the teachings herein are applicable to the use of multiple disks. Disk 20 includes opposing major upper and lower surfaces, each of which can be used to store digital data. A head stack assembly 22 (which may be referred to hereinafter as an HSA) includes a VCM end 24 having a voice coil 26 that is supported in a magnetic field defined by an assembly that is made up of a magnet 28, a lower return plate 30 and an upper return plate which is not shown in the present view for purposes of illustrative clarity. A Head Gimbal Assembly (HGA) 31 forms part of HSA 22, as will be further described. An inner diameter stop pin 32 and an outer diameter stop pin 34 serve to define rotational extents of travel of the HGA by engaging side margins of VCM end 24 at an inner diameter position and an outer diameter position, respectively, and further serve in conducting magnetic flux between lower return plate 30 and the upper return plate. Thus, voice coil 26 is supported in a magnetic field such that a controlled electric current in the voice coil can be used to selectively change the position of HGA 22. In this regard, the HSA includes a hub 40 that is pivotally supported by a pivot 42. A transducer arm arrangement, forming part of HGA 31, extends outward from hub 40, at least generally opposite VCM end 24, to a transducer arrangement 44. In the present example, a pair of transducer arms 46 is used such that a first transducer configuration, associated with an upper one of the arms performs data accesses using an upper surface (visible in FIG. 1) of disk 20, while a second transducer configuration, associated with a lower one of the arms, performs data accesses using a lower surface (not visible in FIG. 1) of disk 20. Generally, each transducer configuration comprises a slider which may support separate read and write transducers in a well known manner. A lift tab 48 extends from the distal end of each of the transducer arms. A flexible circuit assembly 50 supports a number of integrated circuits 52 and further includes flex extensions for interconnecting the various electrical components within drive 10, as well as for use in externally electrically interfacing the hard disk drive. One example of the aforementioned flex extensions comprises an HGA flex extension 54. This highly advantageous HGA flex extension and associated features are described in detail in copending U.S. patent application Ser. No. 11/385,573 file Mar. 20, 2006 and entitled ADVANCED MINIATURE HARD DISK DRIVE AND METHOD which shares the filing date of the present application and is incorporated herein by reference in its entirety. Flexible circuit assembly 50 is itself supported using a flex bracket 56 that is attached to base 12 using suitable fasteners 58 such as, for example, threaded fasteners, as will be described in more detail at an appropriate point below.

With continuing reference to FIG. 1, a latching arrangement (not shown) may be positioned proximate to VCM end 24 of HGA 22 for use in limiting the potential of the HGA with respect to rotating from an unloaded position to a loaded position in which the transducer configurations or sliders of transducer arrangement 44 come into contact with the data surfaces of disk 20 at an undesired time such as, for example, when the disk is not rotating. It is noted that latching arrangements are well known and that any suitable latching arrangement may be used, however, one highly advantageous latching arrangement is described in U.S. Pat. No. 5,404,257 entitled ROTARY INTERTIAL LATCH FOR DISK DRIVE ACTUATOR.

Figure 2:
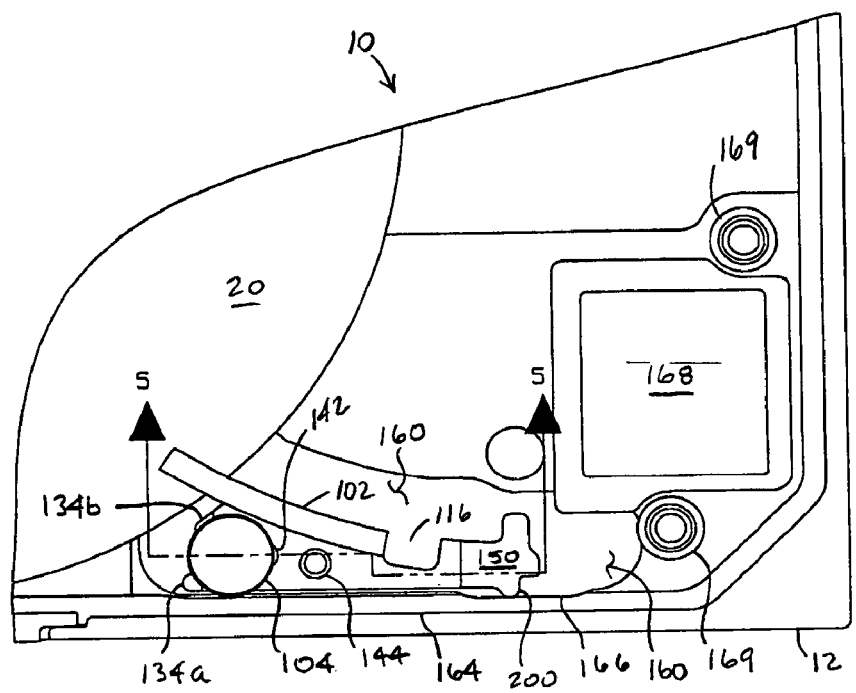
FIG. 2 is a further enlarged cut-away plan view of a portion of the hard disk drive of FIG. 1, shown here to illustrate details with respect to a highly advantageous ramp arrangement.
Figure 3:
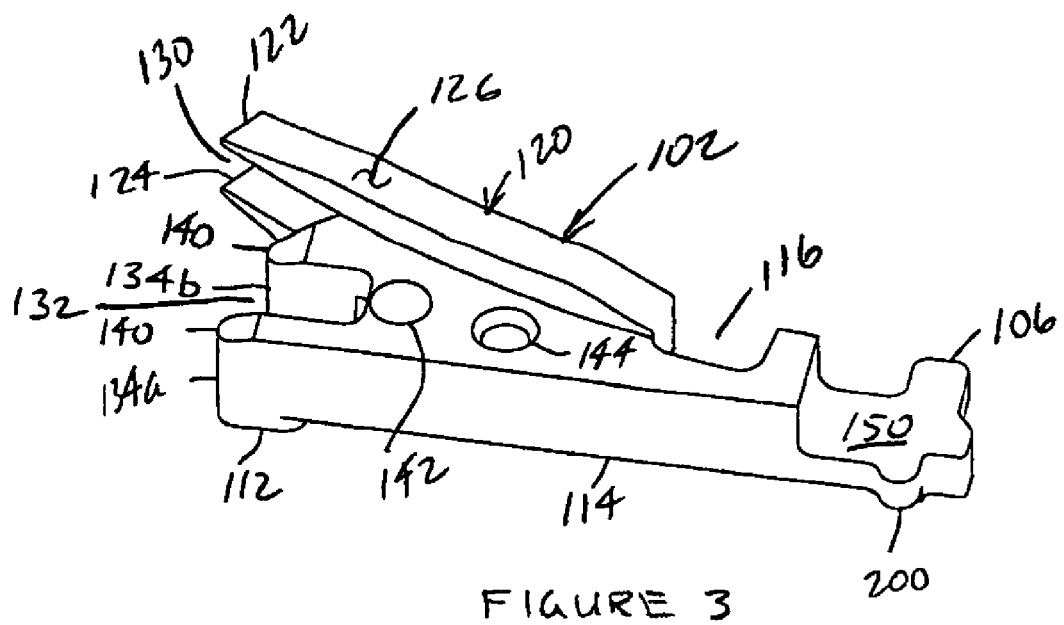
FIG. 3 is an enlarged perspective view of the ramp that is used in the hard disk drive of FIGS. 1 and 2, generally providing a view of the upper side of the ramp.
Figure 4:
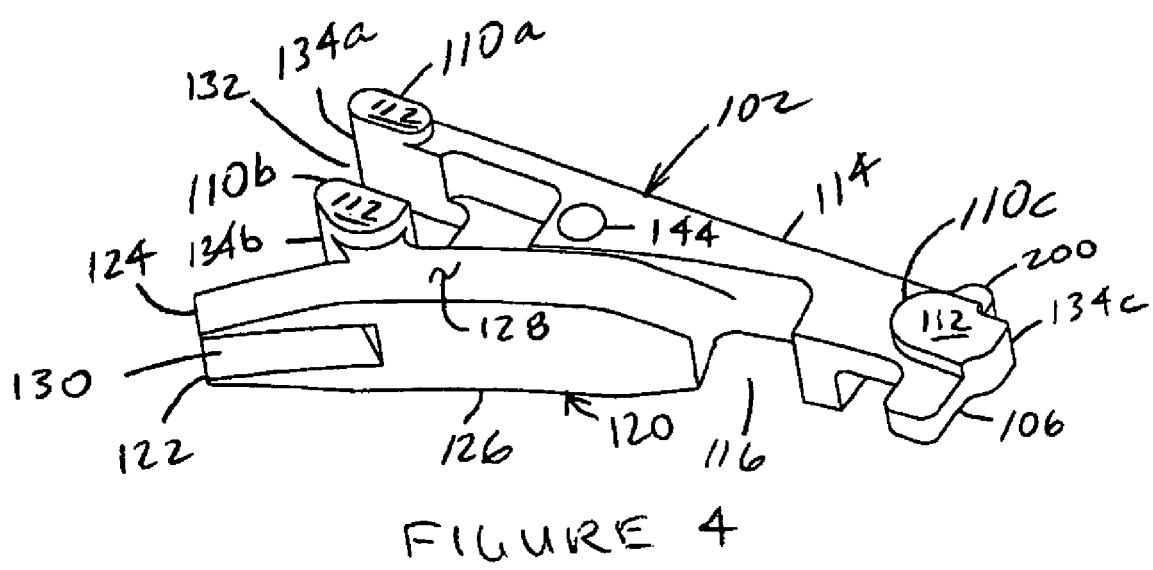
FIG. 4 is another enlarged perspective view of the ramp that is used in the hard disk drive of FIGS. 1 and 2, generally providing a view of the lower structure of the ramp.

Referring to FIGS. 1-4, a ramp arrangement 100 is illustrated including a ramp 102. FIG. 2 is a partially cutaway, further enlarged view of a portion of hard drive 10 showing ramp 102 in an installed condition, while FIGS. 3 and 4 are upper and lower perspective views, respectively, of ramp 102 in an uninstalled state and still further enlarged, shown here to illustrate details with respect to the structure of the ramp. Initially, it is noted that ramp arrangement 100 includes a T-post 104 and a second end portion 106 of flex bracket 56 for use in capturing ramp 102 in the operating position, as will be described below.

Referring primarily to FIGS. 3 and 4, ramp 102 includes at least three feet 110a-c which are best seen in FIG. 4 and may be referred to collectively as feet 110. The latter define a triangular region therebetween, although based on the use of different numbers of feet, differently shaped closed polygons will be defined. Each foot includes a contact surface 112 that may be at least generally planar in configuration, although this is not a requirement. A ramp body 114 extends between the feet such that contact surfaces 112 cooperatively define a plane that is spaced away from ramp body 114 in proximity thereto. Ramp body 114 further defines a notch 116 that can be located at least partially within the triangular region defined between the feet, as illustrated. For the moment, it is sufficient to note that notch 116 serves a specific purpose during drive assembly that is yet to be described. A ramp configuration 120 extends from ramp body 114 so as to form an upper ramp 122 and a lower ramp 124 defining an upper ramp surface 126 (FIG. 3) and a lower ramp surface 128 (FIG. 4), respectively. Distal ends of upper ramp 122 and lower ramp 124 cooperate to define a disk recess 130 therebetween, which is best seen in FIG. 4.

An indexing recess 132 is defined generally at one end of ramp body 114 between first and second extensions 134a and 134b, which may be referred to collectively as extensions 134, and which support feet 110a and 110b, respectively, generally on opposite sides of indexing recess 132. As will be described in further detail, each of extensions 134 includes a bevel 140 for use in assisting installation. Further, for purposes of assisting installation, a biasing bump 142 is provided proximate to indexing recess 130 on an upper surface of ramp body 114. A tooling aperture 144 is configured with a chamfer, proximate to the upper surface of the ramp body, for use in assisting in installation of the ramp in a way that will become evident in view of the discussions which follow. Further installation related features include an engagement surface 150 (FIG. 3) that is formed proximate to a distal end of ramp body 114. Ramp 102 may be formed from any suitable material, using any suitable method, as will be appreciated by one having ordinary skill in the art in view of this overall disclosure. The ramp arrangement may be formed, for example, by molding using an appropriate technique, machining or any suitable combination thereof. For reasons which will become evident, tolerances of importance during and after installation of the ramp arrangement are established based, at least in part, on the positions of contact surfaces 112 in relation to ramp surfaces 126 and 128, along with other features of the ramp such as, for example, disk recess 130. In particular, Z height of the ramp is generally established using feet 110 in a highly advantageous way, as will be described hereinafter.

Figure 5:
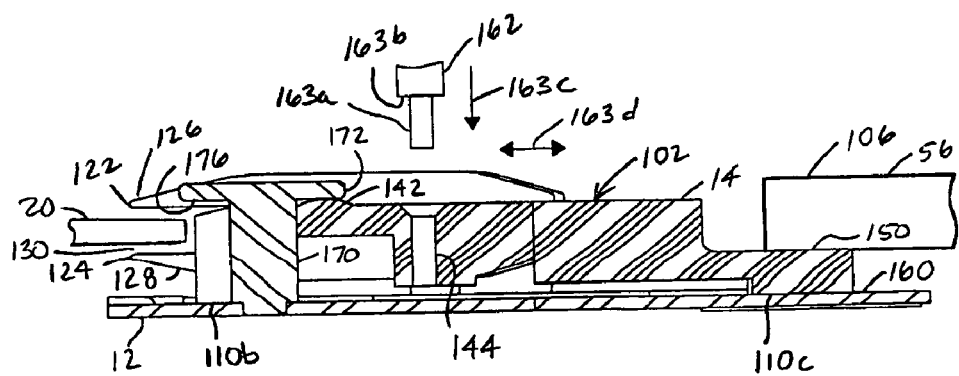
FIG. 5 is a diagrammatic cross-sectional view taken along a segmented line 5-5 through the ramp of FIG. 2, shown here to illustrate details with respect to the structure of the ramp and its relationship to a positioning tool, the rotatable data disk and the arrangement that is used for capturing the ramp in its operational position.

FIGS. 1, 2 and 5 illustrate ramp 102 in an installed condition within base 12. FIG. 5 is a cross-sectional view that has been limited to showing features primarily with respect to ramp arrangement 100, taken generally along a segmentary line 5-5 in FIG. 2 and showing an edge portion of disk 20 received in disk recess 130. As mentioned above, the ramp is captured in its operational position using a number of highly advantageous features. Initially, it is noted that base 12 defines a ramp support surface 160 in a bottom major panel of the base. Ramp support surface 160 includes a controlled tolerance for use in establishing the operational position of the ramp. Accordingly, tolerance characteristics of the ramp support surface can be established in view of tolerances that are required with respect to a desired operational position of the ramp. The lateral extents of ramp support surface 160 are established in view of the installation procedure that is employed for installation, as will be described below. Accordingly, the lateral extents of the ramp support surface are somewhat larger that what is required just to support the three feet of the ramp. The ramp support surface may be formed in any suitable manner including, but not limited to the use of machining, forming or casting. In this regard, it is noted that a machining step is typically required as part of the overall manufacture of base 12. Accordingly, additional machining can generally be performed to provide the ramp support surface at an incremental increase in manufacturing cost. A placement tool 162 is illustrated in a spaced apart relationship from ramp 102 for purposes of illustrative clarity. Tool 162 includes a tip 163a and a shoulder 163b such that tip 163a can be received in tooling aperture 144, by moving tool 162 in a direction 163c, that is indicated by an arrow. Tool 162 thereafter provides for lateral movement 163d of the ramp, as indicated by a double-headed arrow, with feet 110 slidingly engaging ramp support surface 160.

Still describing features with respect to base 12, primarily with reference to FIG. 2, a peripheral upstanding sidewall 164 delimits the bottom major panel of drive 10. For purposes which will be described below, sidewall 164 defines a biasing surface 166 which may be generally planar in lateral extent and transverse to ramp support surface 160. In one implementation, biasing surface 166 can be at least generally orthogonal with respect to ramp support surface 160. Like ramp support surface 160, biasing surface 166 can advantageously be provided using machining at nominal cost, although this is not a requirement and the biasing surface may be formed using any suitable expedient. In another embodiment, a feature such as, for example, a post may be utilized to substitute for the function of biasing surface 166.

Referring to FIGS. 2 and 5, it is noted that flexible circuit assembly 50 and flex bracket 56 have been removed in FIG. 2 to reveal an opening 168 that receives an electrical interface connector (not shown) that is supported by flexible circuit assembly 50 for use in externally interfacing drive 10, while only a cut-away portion of flex bracket 56 is shown in FIG. 5. Further, a pair of bosses 169 is shown for receiving fasteners 58 (see FIG. 1). Bosses 169 may comprise tubular bodies that are suitably affixed to base 12, for example, by welding. Aforementioned T-post 104 includes a post shaft 170 and a head 172. Post shaft 170 includes a distal end that is fixedly received in base 12, for example, by welding, although any attachment expedient may be utilized to maintain the position of post shaft 170 within a desired x-y tolerance on base 12. Head 172 may be separately formed and attached to shaft 170, for example, by welding, adhesives or using a fastener. A fastenerless attachment may be advantageous with respect to space utilization in a miniature drive. In one embodiment, T post 104 may be formed by machining or pressing. The T post can be formed using any suitable material and method, as will be appreciated by one having ordinary skill in the art in view of this overall disclosure. Head 172 defines a surface 176 which confronts base 12. In the present example, surface 176 is at least generally planar in configuration, having an outer edge that is at least somewhat rounded so as to facilitate ramp installation, which is yet to be described.

Figure 6:
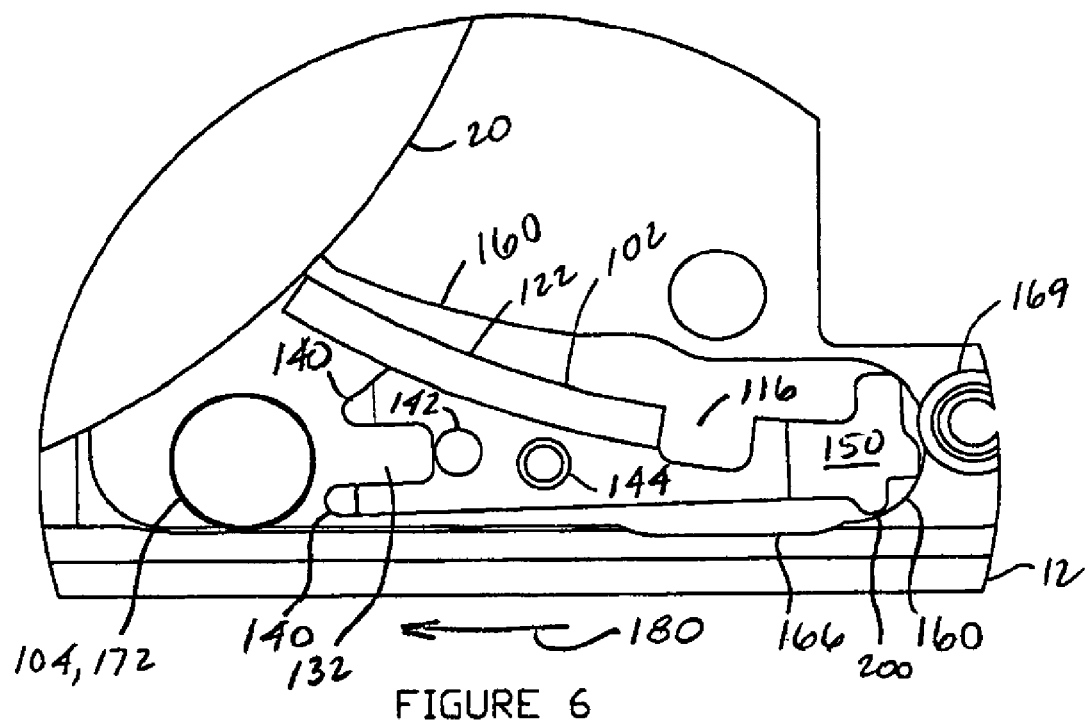
FIGS. 6 and 7 are diagrammatic cut-away plan views of the ramp region of the hard disk drive of FIG. 1, shown here to illustrate a highly advantageous ramp installation sequence.

Turning to FIG. 6 in view of FIGS. 3-5, and having described the physical structure of ramp arrangement 100, including its associated capture features supported by base 12 in detail above, attention is now directed to details with respect to the installation of ramp 102. FIG. 6 is a cut-away view of drive 10 showing the region which supports ramp 102. Initially, contact surfaces 112 of feet 110a-c are engaged against ramp support surface 160, for example, using placement tool 162 (FIG. 5) received in tooling aperture 144 such that the ramp is clear of disk 20, as shown in FIG. 6. HGA 22 of FIG. 1 is installed subsequent to the installation of the ramp. It should be appreciated that just engaging feet 110 against the ramp support surface establishes certain orientation parameters with respect to locating the ramp in the overall hard disk drive. For example, the Z height of all ramp features is established, along with pitch and roll orientation of these features, through the use of at least three ramp feet in cooperation with ramp support surface 160. For purposes of urging ramp feet 110 against ramp support surface 160, it should be mentioned that a downward, at least generally normally oriented biasing force, that is applied anywhere within the triangular region defined between feet 110, will serve to urge all three feet against the ramp support surface. Thus, tooling aperture 144 is located within this triangular region, such that a single tool is not only capable of slidingly moving feet 110 against the ramp support surface, but also simultaneously urging all three feet against support surface 160.

Continuing with a description of ramp installation, as the ramp feet are urged against ramp support surface 160, it should be appreciated that disk recess 130 (see FIGS. 3-5) of the ramp is vertically aligned with disk 20. That is, a desired clearance tolerance is established between the major surfaces of disk 20 and confronting surfaces of the ramp, within recess 130. As installation continues, engagement between the ramp feet and ramp support surface 160 is maintained as the ramp is slidingly moved against the ramp support surface in a direction that is indicated by an arrow 180 such that bevels 140 slide beneath post head 172 while post 144 (see FIG. 5) is received in indexing recess 132, as will be further described.

Figure 7:
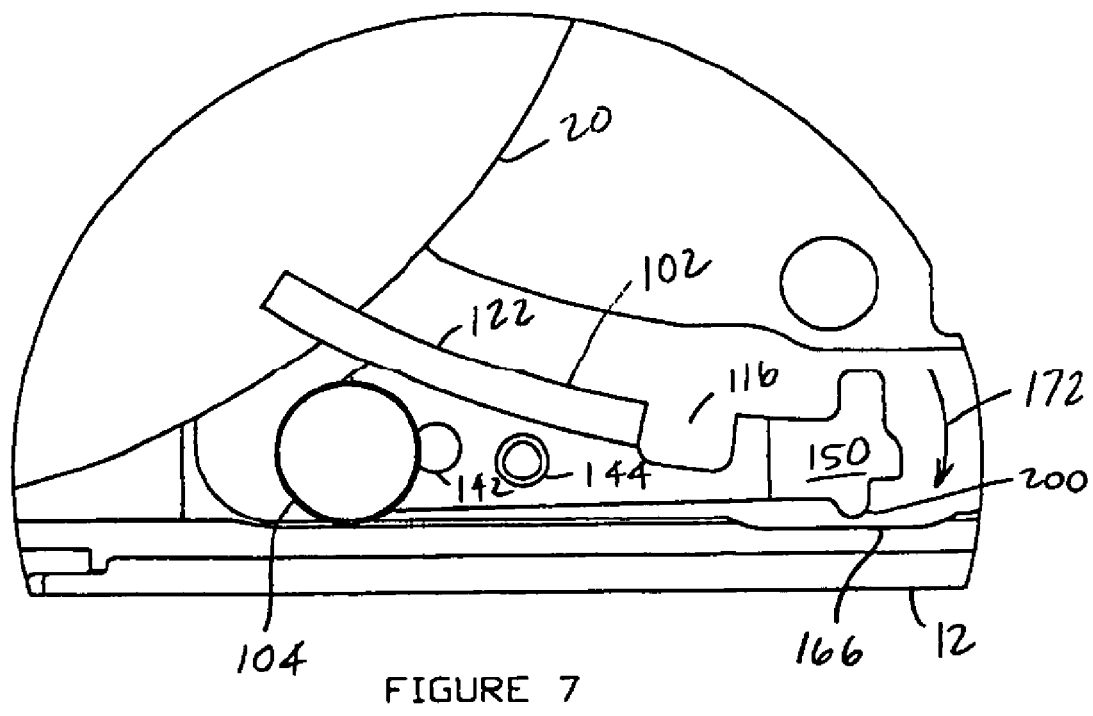

Turning to FIG. 7, ramp 102 is illustrated after having been moved into partial engagement with T-post 104 such that biasing bump 142 contacts lower surface 176 (FIG. 5) of post head 172. This contact serves to urge feet 110 against ramp support surface 160 in a highly advantageous way since the biasing bump is located within the triangular region defined by feet 110. Accordingly, a force is applied which serves to urge all three feet against the ramp support surface. During this motion, upper ramp 122 moves above the upper data surface of disk 20 while lower ramp 124 moves beneath the lower data surface of disk 20, as a desired clearance tolerance is maintained therebetween. Continuing motion in the direction of arrow 180 will cause post shaft 170 to be fully received in indexing recess 132 so as to, at least in part, establish a lateral position of one end of ramp 102. Subsequent rotation, as indicated by a curved arrow 172, of the ramp arrangement around post shaft 170, with the ramp arrangement biased or held thereagainst, serves to bring the ramp arrangement into a final, operational position, as feet 110 move slidingly against ramp support surface 160. More specifically, ramp 102 includes a positioning arm 200, which is also shown in earlier figures and may likewise be referred to as a locating tab, such that a final operating position of the ramp is established by rotating the ramp against T-post 104 until positioning arm 200 contacts biasing surface 166, as is shown in FIG. 2. It is noted that indexing recess 132 may have a width that provides a clearance fit of post shaft 170 therein or, in another embodiment, the indexing recess width can be less than the post width, such that a resilient bias is applied to the post shaft by indexing extensions 134. This resilient bias can be used for purposes of capturing the post shaft in the indexing recess. It is noted that ramp recess 130 is sufficiently deep so as to avoid contact with the edge of disk 20 throughout the installation procedure, even with the ramp in the position shown in FIG. 7, with the ramp somewhat rotated toward disk 20.

Referring to FIGS. 1 and 5, with ramp 102 held in its operational position, ramp installation is concluded by installing flexible circuit assembly 50 using fasteners 58 such that distal portion 106 of flexible circuit bracket 56 applies a downward force onto engagement surface 150 whereby to urge ramp foot 110*c* against ramp support surface 160. Accordingly, ramp 102 is captured in its operating position between T-post 104, ramp support surface 160, biasing surface 166, serving as an indexing stop, and end portion 106 of flex bracket 56. The ramp should be captured sufficiently tightly so as to ensure resistance to contemplated levels of mechanical shock and vibration. Applicant's testing has confirmed more than adequate performance with respect to mechanical shock and vibration.

Referring to FIG. 1, once the ramp has been installed, HGA 22 of FIG. 1 can be installed. As part of the installation procedure, lift tabs 48 are initially positioned in notch 116. Thereafter, in the view of FIG. 1, HGA 22 is rotated clockwise such that the lower lift tab engages lower ramp surface 128 (best seen in FIG. 4) and the upper lift tab engages upper ramp surface 126 (best seen in FIG. 3).

The captured ramp arrangement described herein is considered to be highly advantageous for a number of reasons. It can be integrally molded from a suitable material for use in a miniature drive with more than adequate molding tolerances and with no requirement for insert molding sleeves, metal reinforcements and the like. Such metal reinforcement features are not needed, since capture forces are well-controlled. Moreover, such features are difficult to employ at the molding scales contemplated for use in a miniature form factor drive, since the part is generally too small to readily support a metal insert. With respect to ramp positional tolerances, the use of a machined surface to support the three ramp feet is considered to be highly advantageous in and by itself, as described above. Further, installation of T-post 104 is straight-forward and its location is well-controlled using state-of-the-art technology. Cooperatively engaging the ramp support surface, T-post and biasing surface 166 establishes all tolerances with respect to the ramp operational position. Still further, the flex bracket represents an existing component that is now used in the added function of capturing the ramp arrangement.

What is claimed is:

1. A digital data storage apparatus, comprising:
   a housing defining both a housing interior and a ramp support surface;
   a disk supported for rotation within the housing interior;
   a head gimbal assembly supported within the housing interior for use in pivotally accessing the disk in performing one or more data accesses and for pivotally moving the head gimbal assembly to an unloaded position from an access position;
   a flexible circuit having at least one integrated circuit mounted thereon and electrically coupled to the head gimbal assembly;
   a bracket securing the flexible circuit to the housing interior;
   a post secured to the ramp support surface;
   a ramp arrangement that is configured for receiving the head gimbal assembly in the unloaded position for use in at least partially establishing an operational position of the ramp arrangement in the housing, the ramp arrangement including an indexing recess and a locating tab, the post positioned within the indexing recess and the locating tab captured between the bracket and the ramp support surface.

2. The digital data storage apparatus of claim 1, further comprising a head secured to the post, the ramp arrangement captured between the head and the ramp support surface.

3. The digital data storage apparatus of claim 2, further comprising a biasing member secured to the ramp and engaging the head to urge the ramp against the flexible circuit.

4. The digital data storage apparatus of claim 3, wherein the biasing member is a bump formed on the ramp arrangement.

5. The digital data storage apparatus of claim 1, wherein the ramp arrangement further comprises three feet positioned against the flexible circuit.

6. The digital data storage apparatus of claim 5, wherein the post is positioned among the three feet.

7. The digital data storage apparatus of claim 5, wherein the indexing recess is a notch extending between two of the three feet.

8. The digital data storage apparatus of claim 1, wherein the ramp arrangement includes first and second opposing ramp surfaces extending over opposing sides of the disk.

9. A method comprising:
mounting a flexible circuit over a ramp support surface formed on the interior of a housing, the housing further comprising a post extending through the flexible circuit;
mounting a ramp arrangement including an indexing recess and a locating tab over the flexible circuit such that the post is positioned within the indexing recess; and
securing a bracket to the housing having the locating tab and flexible circuit captured by the bracket.

10. The method of claim 9, further comprising mounting within the housing:
a disk supported for rotation within the housing interior; and
a head gimbal assembly supported within the housing interior for use in pivotally accessing the disk in performing one or more data accesses and for pivotally moving the head gimbal assembly to an unloaded position from an access position.

11. The method of claim 9, wherein the ramp arrangement includes at least one ramp surface extending over the disk and positioned to engage the head gimbal assembly.

12. The method of claim 9, wherein the post further comprises a head secured thereto and wherein mounting the ramp arrangement over the flexible circuit comprises capturing the ramp arrangement between the head and the ramp support surface.

13. The method of claim 12, wherein the ramp arrangement further comprises a biasing member secured to the ramp and engaging the head to urge the ramp against the flexible circuit.

14. The method of claim 13, wherein the biasing member is a bump formed on the ramp arrangement.

15. A digital data storage apparatus, comprising:
a housing defining an interior surface;
a disk supported for rotation within the housing;
a head gimbal assembly supported within the housing and configured for pivotally moving the head gimbal assembly to an unloaded position from an access position;
a flexible circuit having at least one integrated circuit mounted thereon and electrically coupled to the head gimbal assembly;
a means for fastening the flexible circuit to the housing;
a post secured to the interior surface and extending through the flexible circuit; and
a ramp arrangement that is configured for receiving the head gimbal assembly in the unloaded position for use in at least partially establishing an operational position of the ramp arrangement in the housing, the ramp arrangement including an indexing recess and a locating tab, the post positioned within the indexing recess and the locating tab captured between the means for fastening and the interior surface.

16. The digital data storage apparatus of claim 15, further comprising a head secured to the post, the ramp arrangement captured between the head and the ramp support surface.

17. The digital data storage apparatus of claim 16, further comprising a biasing member secured to the ramp and engaging the head to urge the ramp against the flexible circuit.

18. The digital data storage apparatus of claim 15, wherein the ramp arrangement further comprises three feet positioned against the flexible circuit.

19. The digital data storage apparatus of claim 18, wherein the post is positioned among the three feet.

20. The digital data storage apparatus of claim 15, further comprising a biasing member secured to the ramp and engaging the head to urge the ramp against the flexible circuit.

* * * * *